United States Patent
Guo et al.

(10) Patent No.: US 11,630,047 B2
(45) Date of Patent: Apr. 18, 2023

(54) ADJUSTMENT DEVICE AND METHOD FOR FLEXIBLE WALL SURFACE SUITABLE FOR DROPLET IMPACT

(71) Applicant: BINZHOU UNIVERSITY, Binzhou (CN)

(72) Inventors: Ruichao Guo, Binzhou (CN); Chuanmei Xie, Binzhou (CN)

(73) Assignee: BINZHOU UNIVERSITY, Binzhou (CN)

( * ) Notice: Subject to any disclaimer, the term of this patent is extended or adjusted under 35 U.S.C. 154(b) by 0 days.

(21) Appl. No.: 17/831,419

(22) Filed: Jun. 2, 2022

(65) Prior Publication Data
US 2023/0023331 A1    Jan. 26, 2023

Related U.S. Application Data

(63) Continuation of application No. PCT/CN2021/126004, filed on Oct. 25, 2021.

(51) Int. Cl.
*G01N 13/00* (2006.01)
*E04F 13/08* (2006.01)

(52) U.S. Cl.
CPC ......... *G01N 13/00* (2013.01); *E04F 13/0807* (2013.01)

(58) Field of Classification Search
CPC .............................. G01N 13/00; E04F 13/0807
USPC ........................................................ 73/159
See application file for complete search history.

(56) References Cited

U.S. PATENT DOCUMENTS 1,118,579 A * 11/1914 Pilkington .............. C03B 17/04
74/568 R

FOREIGN PATENT DOCUMENTS

| CN | 2011232304 A | 11/2011 | |
|---|---|---|---|
| CN | 104019991 A | 9/2014 | |
| CN | 107340178 A | 11/2017 | |
| CN | 209058465 U | * 7/2019 | ............... A47C 7/14 |
| CN | 111795793 A | 10/2020 | |

OTHER PUBLICATIONS

Machine translation of CN-209058465-U.*
Internation Search Report of PCT/CN2021/126004, dated Apr. 18, 2022.

* cited by examiner

*Primary Examiner* — Nathaniel J Kolb

(57) ABSTRACT

The present invention provides an adjustment device for a flexible wall surface suitable for droplet impact, which includes a base, a staybolt, an experiment substrate and the wall surface to be tested, wherein the periphery of the wall surface to be tested is fixed to the upper surface of the experiment substrate by an adhesion agent and the inclination angle of the wall surface to be tested is adjusted by adjusting the left two staybolts and right two staybolts on the experiment substrate to different heights; and a plurality of through holes are uniformly formed on the experiment substrate and provided therein with wall surface adjusting bolts used to abut against and apply force to the wall surface to be tested, so as to allow the wall surface to be tested to present a desired curved shape.

5 Claims, 6 Drawing Sheets

ADJUSTMENT DEVICE AND METHOD FOR FLEXIBLE WALL SURFACE SUITABLE FOR DROPLET IMPACT

CROSS-REFERENCE TO RELATED APPLICATIONS

This application is a continuation of International Application No. PCT/CN2021/126004 with a filing date of Oct. 25, 2021, designating the United states, and further claims to the benefit of priority from Chinese Application No. 202110813246.0 with a filing date of Jul. 19, 2021. The content of the aforementioned applications, including any intervening amendments thereto, are incorporated herein by reference.

TECHNICAL FIELD

The present invention relates to an adjustment device and method for a flexible wall surface, in particular to an adjustment device and method for a flexible wall surface suitable for droplet impact.

BACKGROUND

The phenomenon of droplet impact widely exists in nature, agriculture and engineering technologies. This phenomenon is widely used in fields, such as energy, power, chemical engineering, metallurgy and aerospace, due to its strong mass and heat transfer capacity, and can be exemplified by spray printing, inkjet printing, spray cooling, oil droplet impact on a cylinder wall and medicament droplet impact on crops during pesticide spraying. The phenomenon of droplet impact involves a variety of scientific issues, such as heat and mass transfer and fluid mechanics, and becomes a hot spot in domestic and foreign engineering researches in recent years due to the complexity of its action mechanism and the importance of related industrial processes.

In light of the complexity of the wall-surface droplet impact phenomenon, an experimental research method becomes a common method of revealing the mechanism of the droplet impact phenomenon, so it is imperative to design an experimental device that can reflect multiple factors of droplet impact on a wall surface in practical engineering. However, in engineering technologies, the phenomenon where droplets impact angled and curved surfaces exists, and can be exemplified by water drop impact on blades in a steam turbine device, droplet impact on a heat exchange tube surface in a horizontal tube falling-film evaporator and spray coating technologies applied to curved or spherical drug particles in pharmaceutical industries; in addition, impacted objects may be at a high temperature, and the droplet impact phenomenon can be exemplified by spray cooling for a heated metal surface. Therefore, the invention of an adjustment device for a wall surface under droplet impact, which can satisfy multiple inclination angles, flexible curved surfaces and various temperatures, becomes a key to satisfy experimental researches regarding the droplet impact on a wall surface.

SUMMARY OF THE INVENTION

In order to overcome the above technical shortcomings, the present invention provides an adjustment device and method for a flexible wall surface suitable for droplet impact.

The adjustment device for a flexible wall surface suitable for droplet impact according to the present invention comprises a base serving for fixing and supporting, a staybolt, an experiment substrate and the wall surface to be tested, wherein each of the left and right ends of the experiment substrate is provided with two vertical bolt holes at intervals and the experiment substrate is provided on the base through the four staybolts in coordination with the vertical bolt holes; the periphery of the wall surface to be tested is fixed to the upper surface of the experiment substrate by an adhesion agent and the inclination angle of the wall surface to be tested is adjusted by adjusting the left two staybolts and right two staybolts on the experiment substrate to different heights; and a plurality of through holes are uniformly formed on the experiment substrate below the wall surface to be tested and provided therein with wall surface adjusting bolts used to abut against and apply force to the wall surface to be tested, so as to allow the wall surface to be tested to present a desired curved shape.

In the adjustment device for a flexible wall surface suitable for droplet impact according to the present invention, a first guide groove and a second guide groove are formed on the base in parallel with each other and are provided therein with compression springs, sliders are placed in the first guide groove and the second guide groove at the two ends of the compression springs, longitudinal bolt holes are formed on the base at both ends of the first guide groove and the second guide groove and provided therein with longitudinal adjusting bolts, and the locations of the sliders in the first guide groove and the second guide groove are adjusted by adjusting the feed amount of the longitudinal adjusting bolts in the longitudinal bolt holes; an inner polish hole in coordination with the lower end of the staybolt is formed on the slider.

In the adjustment device for a flexible wall surface suitable for droplet impact according to the present invention, the through hole consists of a lower threaded hole and an upper square hole and the wall surface adjusting bolt consists of a lower external thread portion which is in coordination with the threaded hole and an upper polish rod portion whose periphery is provided with a guide sleeve located in the square hole and whose top end is an arc curved surface used to abut against the wall surface to be tested.

In the adjustment device for a flexible wall surface suitable for droplet impact according to the present invention, a plurality of transverse heating holes are formed on the experiment substrate, located outside the through holes or between adjacent through holes, and provided therein with heating rods.

In the adjustment device for a flexible wall surface suitable for droplet impact according to the present invention, the staybolt is provided with a hexahedron for facilitating its rotation.

The adjustment method of the adjustment device for a flexible wall surface suitable for droplet impact according to the present invention comprises the following steps:

a) parameter measurement: the distance between the left vertical bolt hole and the right vertical bolt hole in the experiment substrate is measured first and denoted as L; the inclination angle of the wall surface to be tested which is required in experiments is set as θ;

b) setup of the height of the staybolt: the height difference h between the left two staybolts and the right two staybolts is calculated by equation (1):

$$h = L * \sin\theta \quad (1)$$

Then, the heights of the left two staybolts below the experiment substrate are firstly adjusted to be in consistency and set as L1, and then, the heights of the right two staybolts below the experiment substrate are adjusted to L1+h;

c) adjustment on the distance between the sliders: the distance ΔS between the two sliders in the first guide groove and the second guide groove is calculated by equation (2):

$$\Delta S = L^* \cos\theta \quad (2)$$

The locations of the two sliders in the first guide groove and the second guide groove are adjusted to be in consistency by adjusting the feed amount of the longitudinal adjusting bolt and the distance between the two sliders in the same guide groove is adjusted to ΔS;

d) adjustment on the shape of the wall surface: based on the curved shape required to be simulated by the wall surface to be tested, the wall surface to be tested presents the curved shape required to be simulated by adjusting the feed amount of the wall surface adjusting bolt at the corresponding location, and the obtained wall surface to be tested is then placed into an experimental device to perform a corresponding experiment regarding a wall-surface droplet impact phenomenon.

The present invention has the following beneficial effects. In the adjustment device and method for a flexible wall surface suitable for droplet impact according to the present invention, the two vertical bolt holes are formed on each of both ends of the experiment substrate, and the experiment substrate is provided on the base through the staybolts in coordination with the vertical blot holes, such that the wall surface to be tested may present different inclination angles by changing the height difference between the left staybolts and the right staybolts, which satisfies requirements of the wall-surface droplet impact experiment for inclined wall surfaces. By forming the plurality of through holes below the wall surface to be tested and providing the wall surface adjusting bolts in the through holes and by allowing the top ends of the wall surface adjusting bolts at different locations to abut against the wall surface to be tested with different feed amounts, the wall surface to be tested can present different curved surfaces, which satisfies requirements of the wall-surface droplet impact experiment for wall surfaces with different curved shapes.

Accordingly, with the adjustment device and method for a flexible wall surface suitable for droplet impact according to the present invention, both the inclination angle of the wall surface to be tested and the different curved shapes of the wall surface to be tested may be adjusted, which satisfies the requirements of the wall-surface droplet impact experiment for wall surfaces with different inclination angles and different curved shapes.

Figure 1:
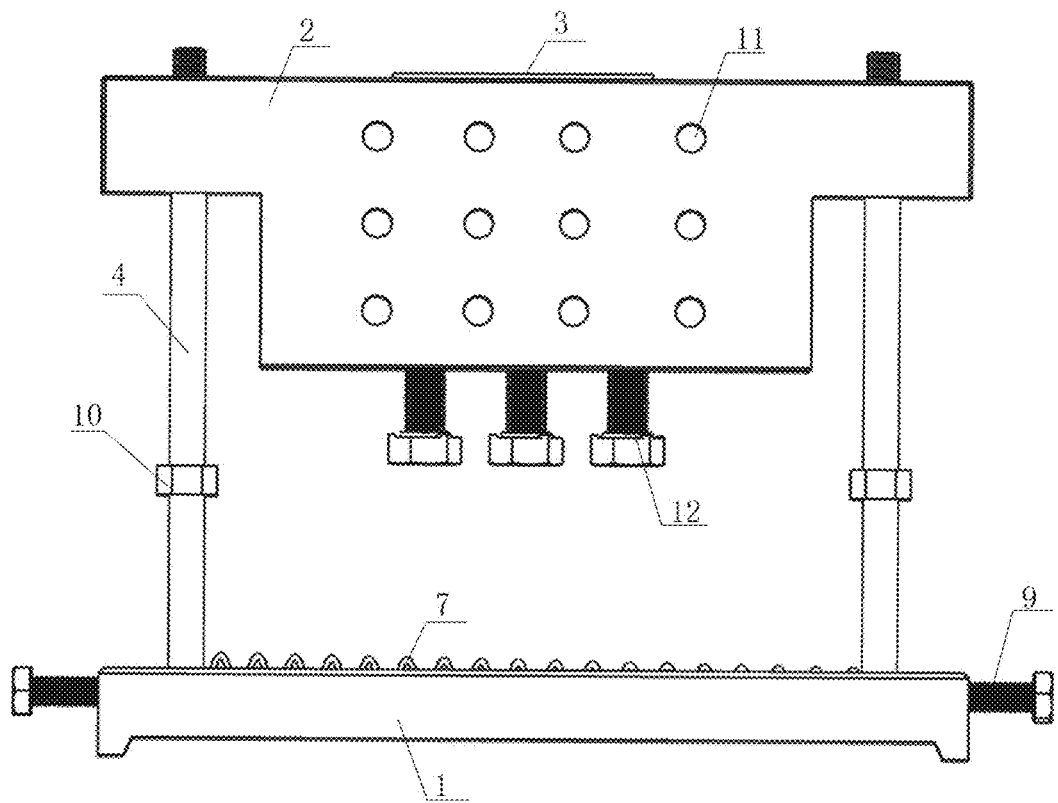
FIG. 1 is a front view of an adjustment device for a flexible wall surface suitable for droplet impact according to the present invention.
Figure 2:
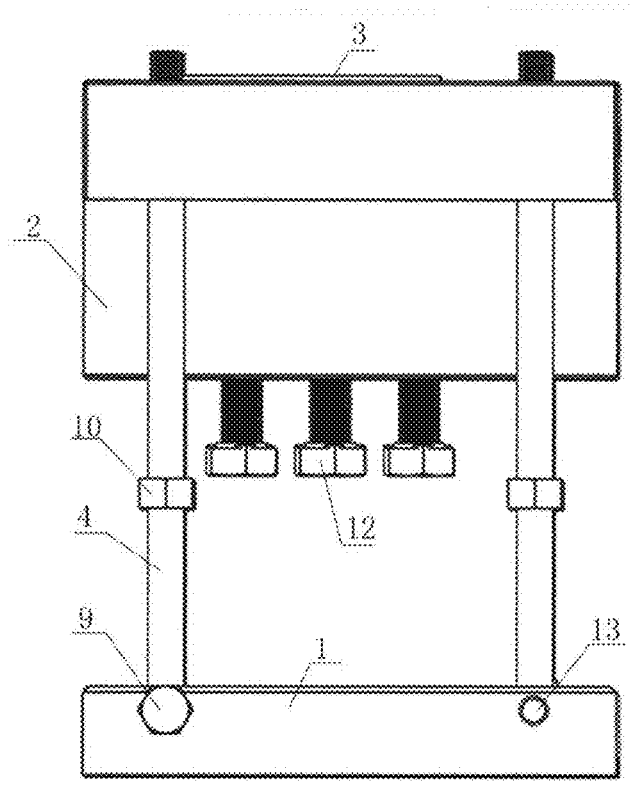
FIG. 2 is a left view of the adjustment device for a flexible wall surface suitable for droplet impact according to the present invention.
Figure 3:
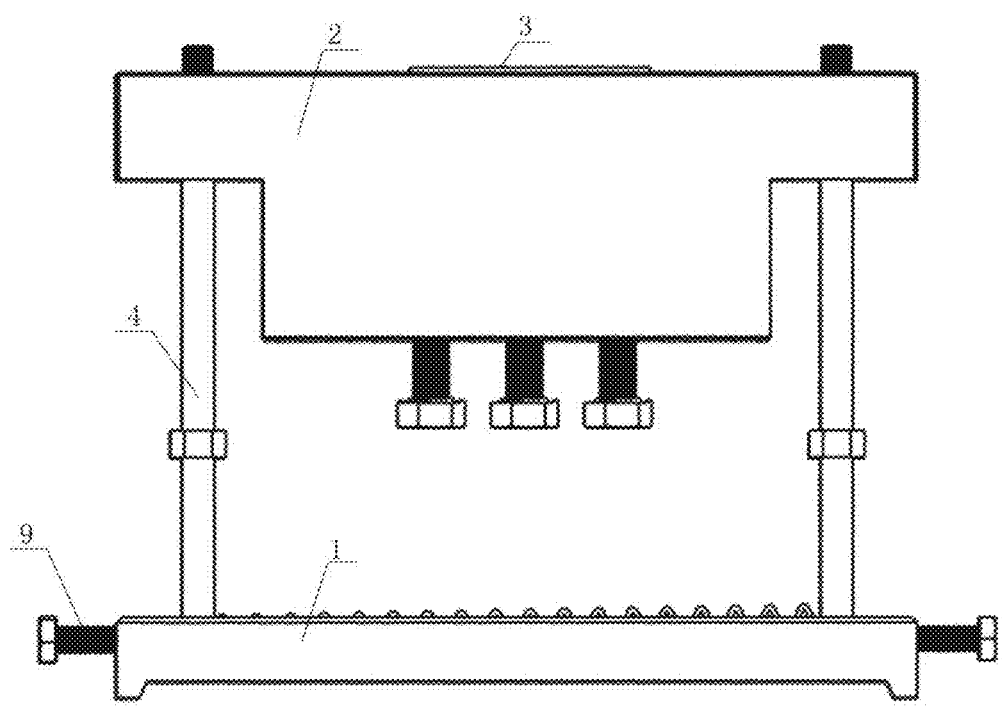
FIG. 3 is a rear view of the adjustment device for a flexible wall surface suitable for droplet impact according to the present invention.
Figure 4:
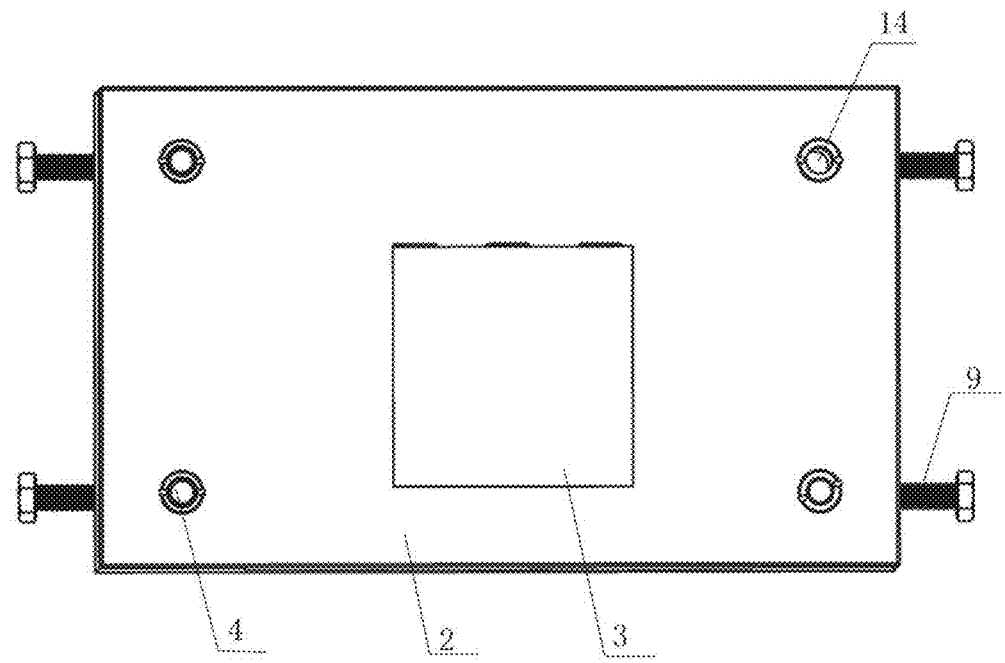
FIG. 4 is a top view of the adjustment device for a flexible wall surface suitable for droplet impact according to the present invention.
Figure 5:
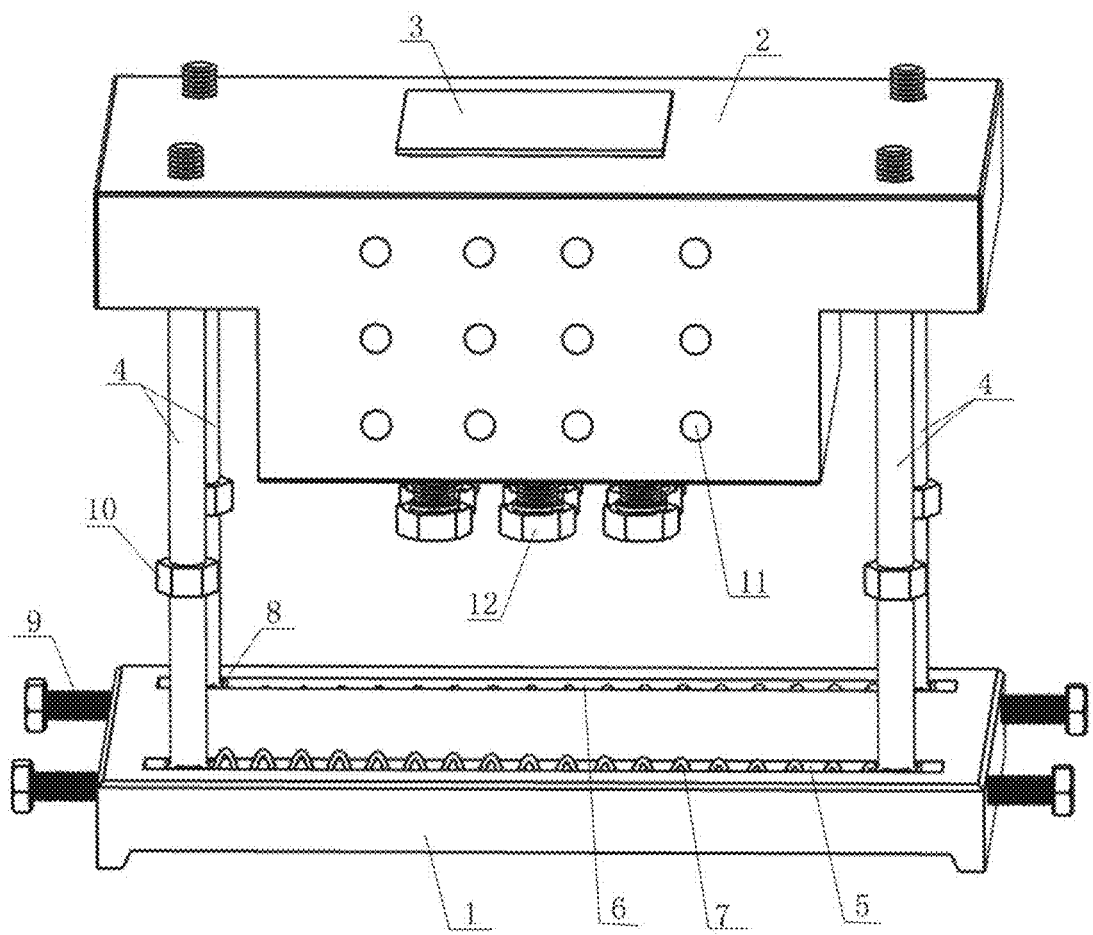
FIG. 5 is a perspective view of the adjustment device for a flexible wall surface suitable for droplet impact according to the present invention.

In the drawings: 1-base; 2-experiment substrate; 3-wall surface to be tested; 4-staybolt; 5-first guide groove; 6-second guide groove; 7-compression spring; 8-slider; 9-longitudinal adjusting bolt; 10-hexahedron; 11-heating hole; 12-wall surface adjusting bolt; 13-longitudinal bolt hole; 14-vertical bolt hole; 15-inner polish hole; 16-through hole; 17-threaded hole; 18-square hole; 19-external thread portion; 20-guide sleeve.

DETAILED DESCRIPTION OF PREFERRED EMBODIMENTS

The present invention will be further described below in conjunction with the drawings and embodiments.

FIGS. 1-5 are a front view, a left view, a rear view, a top view and a perspective view of an adjustment device for a flexible wall surface suitable for droplet impact according to the present invention respectively. The device comprises a base 1 serving for fixing and supporting, an experiment substrate 2, a wall surface 3 to be tested whose periphery is fixed on the upper surface of the experiment substrate 2 through an adhesion agent to allow deformation in the middle part thereof, a staybolt 4 and a wall surface adjusting bolt 12. Each of the left and right ends of the experiment substrate 2 is provided with two vertical bolt holes 14, the experiment substrate 2 is provided on the base 1 through the 4 staybolts 4 in coordination with the vertical bolt holes 14, the staybolt 4 is a single-head bolt and only the upper portion of the staybolt 4 is provided with a threaded portion in coordination with the vertical bolt hole 14. The left two staybolts 4 on the experiment substrate 2 are set to the same height, the right two staybolts 4 on the experiment substrate 2 are set to the same height, and a height difference exists between the right two staybolts 4 and the left two staybolts 4, such that the wall surface 3 to be tested may present a certain inclination angle, which satisfies requirements of a wall-surface droplet impact experiment for inclined wall surfaces.

Figure 8:
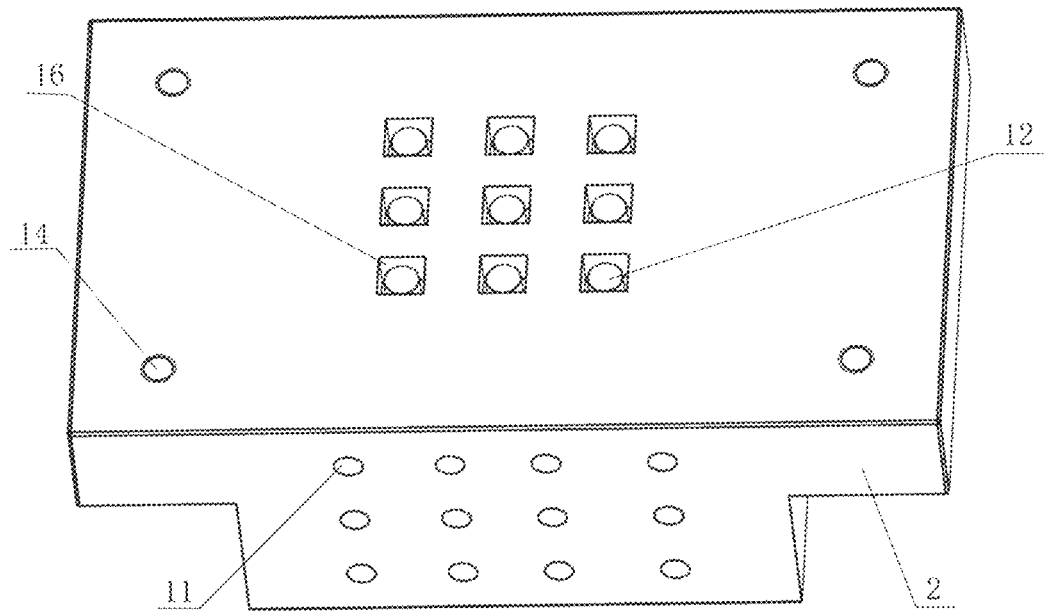
FIG. 8 is a perspective view of an experiment substrate of the present invention.

FIG. 8 is a perspective view of the experiment substrate of the present invention. The experiment substrate 2 below the wall surface 3 to be tested is provided with a vertical through hole 16 provided therein with the wall surface adjusting bolt 12. The upper end of the adjusting bolt 12 abuts against the wall surface 3 to be tested and does not exert pressure on the wall surface 3 to be tested if the wall surface 3 to be tested is required to be a plane and does not curve, and the wall surface 3 to be tested does not deform.

If the wall surface 3 to be tested is required to present a certain curved surface, it can present the demanded curved shape by adjusting the feed amount of the wall surface adjusting bolt 12 at the corresponding location to allow the top end of the adjusting bolt 12 to abut against and exert pressure on the wall surface 3 to be tested.

Figure 9:
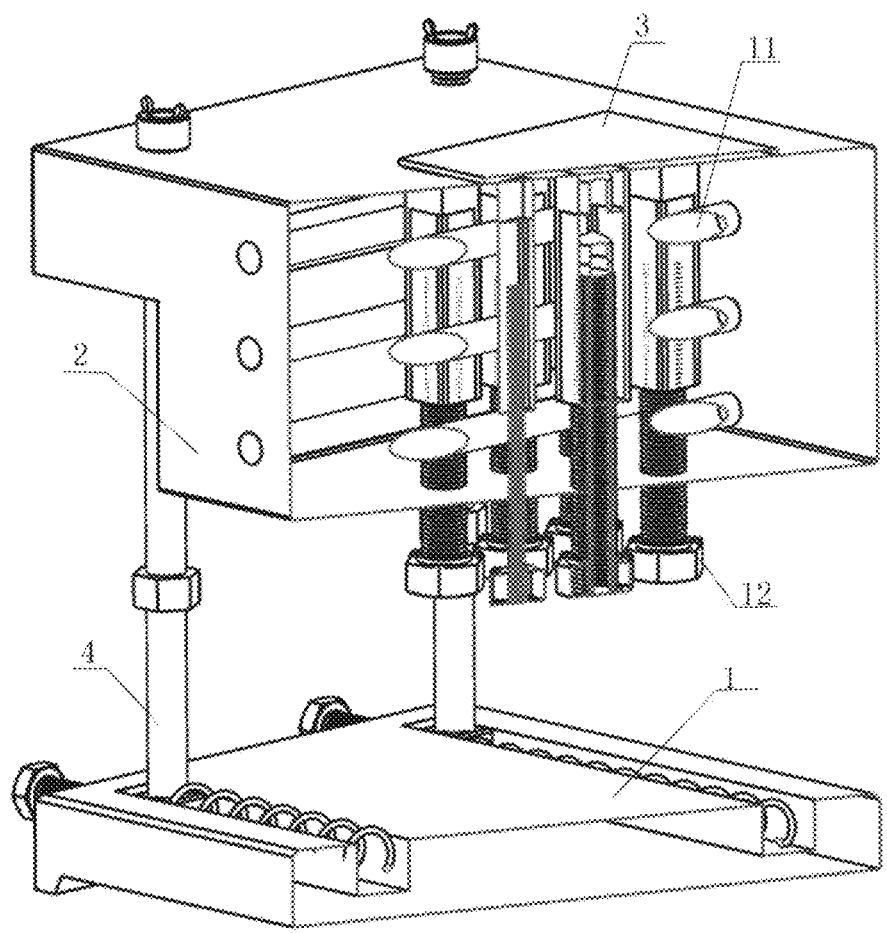
FIG. 9 is a cross-sectional view of the adjustment device for a flexible wall surface suitable for droplet impact according to the present invention.

In order to enable the wall surface 3 to be tested to satisfy temperature requirements in the experiment, the shown experiment substrate 2 is evenly provided with several heating holes 11 provided therein with heating rods. The wall surface 3 to be tested can satisfy the temperature requirements in the wall-surface droplet impact experiment by heating the experiment substrate 2 with the heating rod. FIG. 9 is a cross-sectional view of the adjustment device for a flexible wall surface suitable for droplet impact according to the present invention and the shown heating holes 11 are distributed in both sides of the through hole 16.

Figure 6:
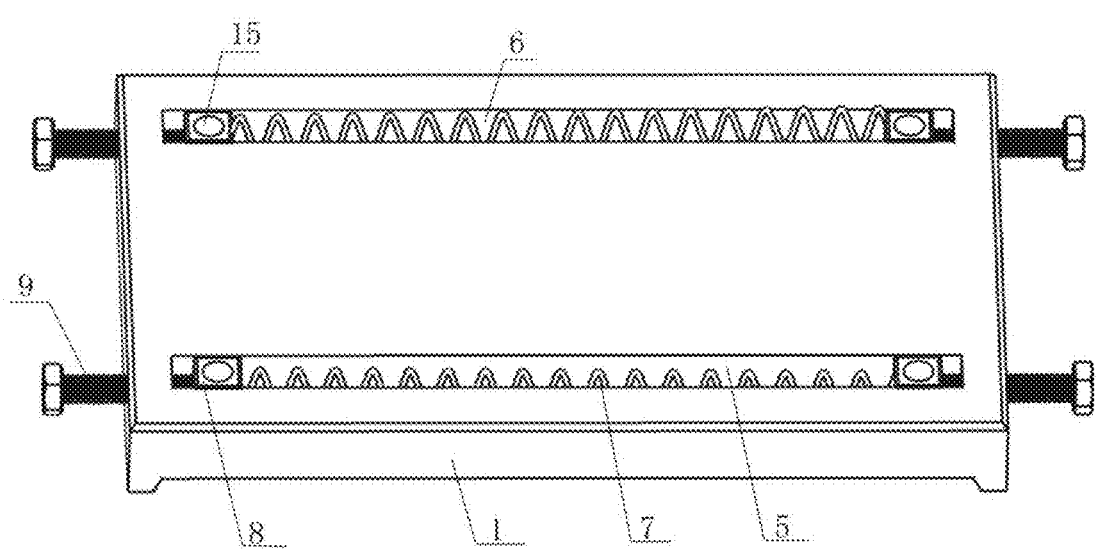
FIG. 6 is a schematic structural view of the coordination of a base with a compression spring, a slider and a longitudinal adjusting bolt in the present invention.
Figure 7:
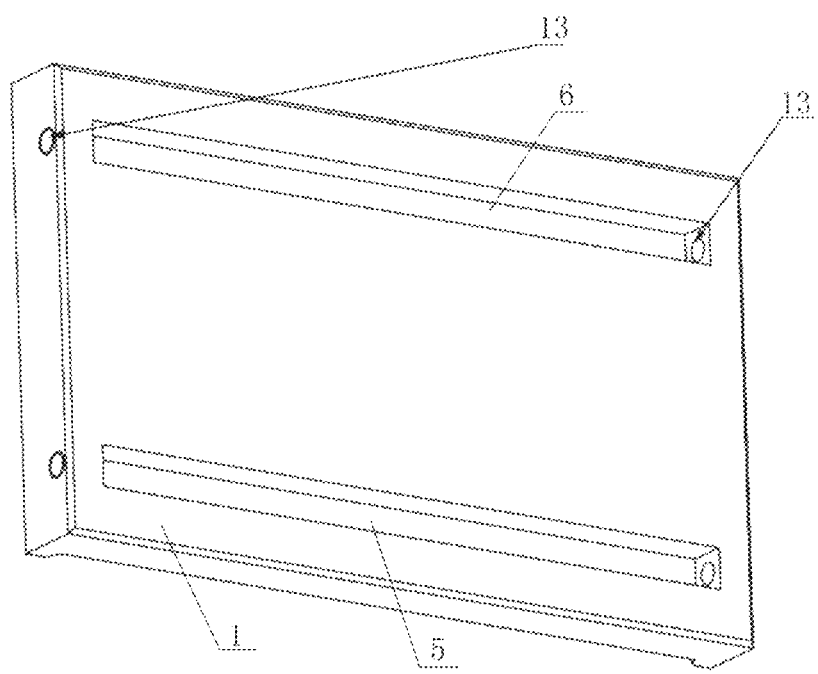
FIG. 7 is a schematic structural review of the base of the present invention.

FIG. 6 is a schematic structural view of the coordination of the base with a compression spring, a slider and a longitudinal adjusting bolt in the present invention. FIG. 7 is a schematic structural view of the base of the present invention. The shown base 1 is provided with a first guide groove 5 and a second guide groove 6 in parallel with each other. Each of the first guide groove 5 and the second guide groove 6 is provided with the compression spring 7 having both ends provided with the sliders 8. The slider 8 is provided with an inner polish hole 15 that holds the lower end of the staybolt 4 and has an inner diameter greater than the diameter of the lower end of the staybolt 4, so that the lower end of the staybolt 4 can be inserted into the inner polish hole 15 in case that the staybolt 4 is inclined to a certain extent.

Longitudinal bolt holes 13 provided therein with the longitudinal adjusting bolts 9 are provided on the base 1 at both ends of the first guide groove 5 and the second guide groove 6. The top end of the longitudinal adjusting bolt 9 abuts against the slider 8 and the locations of the sliders 8 in the first guide groove 5 and the second guide groove 6 may be adjusted by adjusting the feed amounts of the longitudinal adjusting bolts 9 in the longitudinal bolt holes 13, so as to insert the 4 staybolts 4 into the 4 sliders 8.

Figure 10:
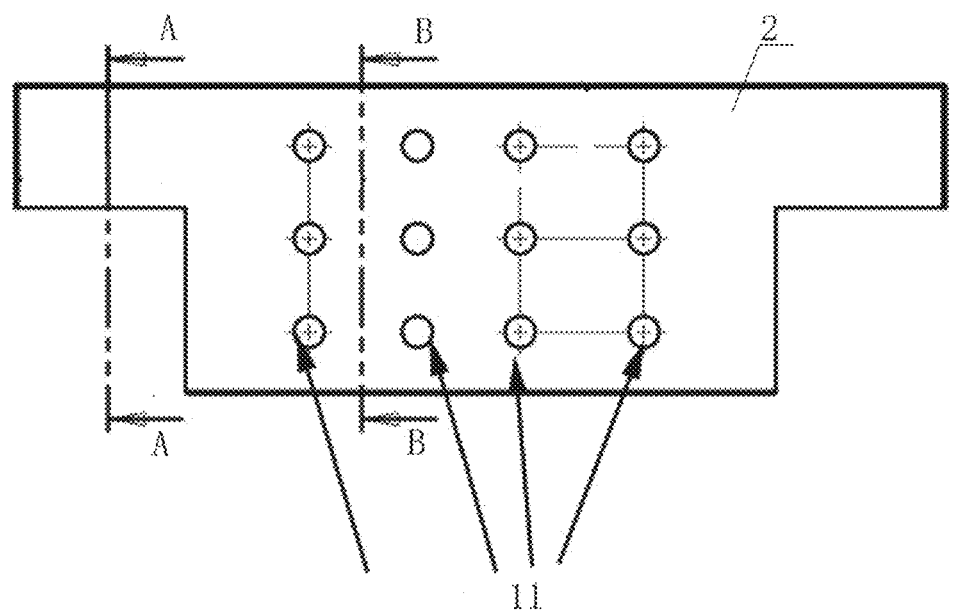
FIG. 10 is a front view of the experiment substrate of the present invention.
Figure 11:
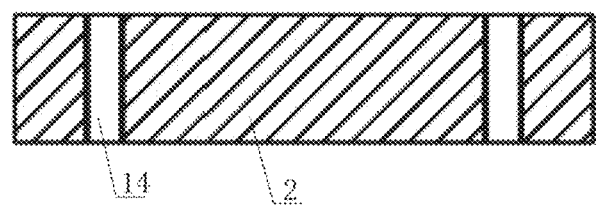
FIG. 11 is a cross-sectional view taken at A-A in FIG. 10.
Figure 12:
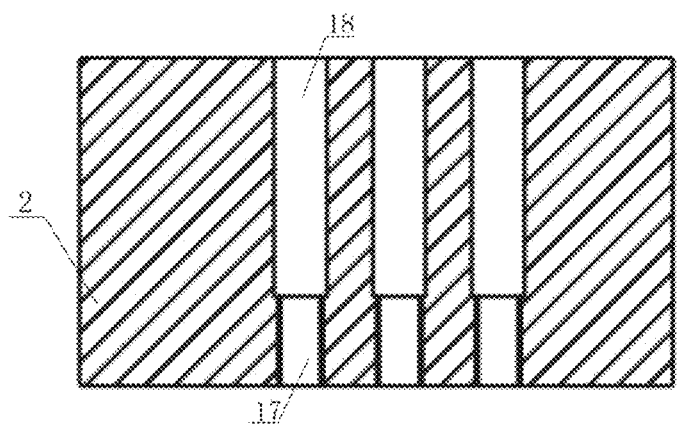
FIG. 12 is a cross-sectional view taken at B-B in FIG. 10.
Figure 13:
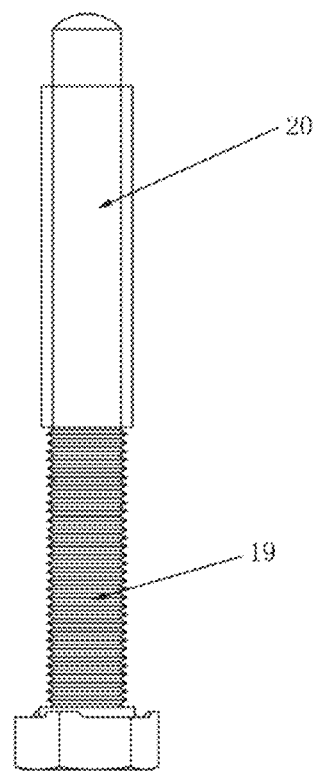
FIG. 13 is a schematic structural view of a wall surface adjusting bolt of the present invention.

FIG. 10 is a front view of the experiment substrate of the present invention. FIGS. 11 and 12 are cross-sectional views taken at A-A and B-B in FIG. 10 respectively. FIG. 13 is a schematic structural view of the wall surface adjusting bolt of the present invention. The lower portion of the shown through hole 16 is a threaded hole 17 and the upper portion thereof is a square hole 18. The lower portion of the shown wall surface adjusting bolt 12 is an external thread portion 19 and the upper portion thereof is a polish rod portion whose periphery is provided with a guide sleeve 20 and whose top end is an arc curved surface used to abut against the wall surface to be tested. The external thread portion 19 is in coordination with the threaded hole 17. The guide sleeve 20 is located in the square hole 18 on the periphery of the polish rod portion of the wall surface adjusting bolt 12. As such, by the adjustment on the protrusion amount of the wall surface adjusting bolt 12, the abutting force and push-out height of the wall surface 3 to be tested by the wall surface adjusting bolt 12 can be adjusted to form the desired curved shape.

An adjustment method of the adjustment device for a flexible wall surface suitable for droplet impact according to the present invention comprises the following steps:

a) parameter measurement: the distance between the left vertical bolt hole and the right vertical bolt hole in the experiment substrate is measured first and denoted as L; the inclination angle of the wall surface to be tested which is required in experiments is set as θ;

b) setup of the height of the staybolt: the height difference h between the left two staybolts and the right two staybolts is calculated by equation (1):

$$h = L * \sin\theta \quad (1)$$

Then, the heights of the left two staybolts below the experiment substrate are firstly adjusted to be in consistency and set as L1, and then, the heights of the right two staybolts below the experiment substrate are adjusted to L1+h;

c) adjustment on the distance between the sliders: the distance ΔS between the two sliders in the first guide groove and the second guide groove is calculated by equation (2):

$$\Delta S = L * \cos\theta \quad (2)$$

The locations of the two sliders in the first guide groove and the second guide groove are adjusted to be in consistency by adjusting the feed amount of the longitudinal adjusting bolt and the distance between the two sliders in the same guide groove is adjusted to ΔS;

d) adjustment on the shape of the wall surface: based on the curved shape required to be simulated by the wall surface to be tested, the wall surface to be tested presents the curved shape required to be simulated by adjusting the feed amount of the wall surface adjusting bolt at the corresponding location, and the obtained wall surface to be tested is then placed into an experimental device to perform a corresponding experiment regarding a wall-surface droplet impact phenomenon.

The invention claimed is:

1. An adjustment device for a flexible wall surface suitable for droplet impact, comprising: a base (1) serving for fixing and supporting, a staybolt (4), an experiment substrate (2) and the wall surface to be tested (3), wherein each of the left and right ends of the experiment substrate is provided with two vertical bolt holes (14) at intervals and the experiment substrate is provided on the base (1) through the four staybolts in coordination with the vertical bolt holes; the periphery of the wall surface to be tested is fixed to the upper surface of the experiment substrate by an adhesion agent and the inclination angle of the wall surface to be tested is adjusted by adjusting the left two staybolts and right two staybolts on the experiment substrate to different heights; and a plurality of through holes (16) are uniformly formed on the experiment substrate below the wall surface to be tested and provided therein with wall surface adjusting bolts (12) used to abut against and apply force to the wall surface to be tested, so as to allow the wall surface to be tested to present a desired curved shape;

a first guide groove (5) and a second guide groove (6) are formed on the base (1) in parallel with each other and are provided therein with compression springs (7) respectively, sliders (8) are placed in the first guide groove and the second guide groove at the two ends of the compression springs, longitudinal bolt holes (13) are formed on the base (1) at both ends of the first guide groove and the second guide groove and provided therein with longitudinal adjusting bolts (9), and the locations of the sliders in the first guide groove and the second guide groove are adjusted by adjusting the feed amount of the longitudinal adjusting bolts in the longitudinal bolt holes; an inner polish hole (15) in coordination with the lower end of the staybolt (4) is formed on the slider.

2. The adjustment device for a flexible wall surface suitable for droplet impact according to claim 1, characterized in that the through hole (16) consists of a lower threaded hole (17) and an upper square hole (18) and the wall surface adjusting bolt (12) consists of a lower external thread portion (19) which is in coordination with the threaded hole and an upper polish rod portion whose periphery is provided with a guide sleeve (20) located in the square hole and whose top end is an arc curved surface used to abut against the wall surface to be tested.

3. The adjustment device for a flexible wall surface suitable for droplet impact according to claim 1, characterized in that a plurality of transverse heating holes (11) are formed on the experiment substrate (2), located outside the through holes (16) or between adjacent through holes, and provided therein with heating rods.

4. The adjustment device for a flexible wall surface suitable for droplet impact according to claim 1, characterized in that the staybolt (4) is provided with a hexahedron (10) for facilitating its rotation.

5. An adjustment method based on the adjustment device for a flexible wall surface suitable for droplet impact according to claim 1, comprising the following steps:
  a) parameter measurement: the distance between the left vertical bolt hole and the right vertical bolt hole in the experiment substrate is measured first and denoted as L; the inclination angle of the wall surface to be tested which is required in experiments is set as $\theta$;
  b) setup of the height of the staybolt: the height difference h between the left two staybolts and the right two staybolts is calculated by equation (1):

$$h = L * \sin \theta \quad (1)$$

then, the heights of the left two staybolts below the experiment substrate are firstly adjusted to be in consistency and set as L1, and then, the heights of the right two staybolts below the experiment substrate are adjusted to L1+h;
  c) adjustment on the distance between the sliders: the distance $\Delta S$ between the two sliders in the first guide groove and the second guide groove is calculated by equation (2):

$$\Delta S = L * \cos \theta \quad (2)$$

the locations of the two sliders in the first guide groove and the second guide groove are adjusted to be in consistency by adjusting the feed amount of the longitudinal adjusting bolt and the distance between the two sliders in the same guide groove is adjusted to $\Delta S$;
  d) adjustment on the shape of the wall surface: based on the curved shape required to be simulated by the wall surface to be tested, the wall surface to be tested presents the curved shape required to be simulated by adjusting the feed amount of the wall surface adjusting bolt at the corresponding location, and the obtained wall surface to be tested is then placed into an experimental device to perform a corresponding experiment regarding a wall-surface droplet impact phenomenon.

* * * * *